(12) United States Patent
Vanni et al.

(10) Patent No.: US 11,435,760 B2
(45) Date of Patent: Sep. 6, 2022

(54) STABILITY AND COMMAND AUGMENTATION SYSTEM FOR AN AIRCRAFT, AND STABILIZATION AND CONTROL METHOD OF AN AIRCRAFT

(71) Applicant: LEONARDO S.P.A., Rome (IT)

(72) Inventors: Roberto Vanni, Samarate (IT); Davide Gagliostro, Samarate (IT); Davide Casola, Samarate (IT)

(73) Assignee: LEONARDO S.P.A., Rome (IT)

( * ) Notice: Subject to any disclaimer, the term of this patent is extended or adjusted under 35 U.S.C. 154(b) by 341 days.

(21) Appl. No.: 16/649,745

(22) PCT Filed: Oct. 5, 2018

(86) PCT No.: PCT/IB2018/057759
§ 371 (c)(1),
(2) Date: Mar. 23, 2020

(87) PCT Pub. No.: WO2019/069287
PCT Pub. Date: Apr. 11, 2019

(65) Prior Publication Data
US 2020/0278698 A1 Sep. 3, 2020

(30) Foreign Application Priority Data
Oct. 5, 2017 (EP) .................................... 17194901

(51) Int. Cl.
*G05D 1/00* (2006.01)
*G05D 1/08* (2006.01)
(Continued)

(52) U.S. Cl.
CPC ........... *G05D 1/0816* (2013.01); *B64C 13/04* (2013.01); *B64C 13/30* (2013.01); *B64C 13/40* (2013.01);
(Continued)

(58) Field of Classification Search
CPC ....... B64C 13/16; B64C 13/503; B64C 19/00; B64C 2220/00; B64C 29/0033;
(Continued)

(56) References Cited

U.S. PATENT DOCUMENTS 3,295,420 A 1/1967 Gleason
3,482,486 A 12/1969 Nordholm, Jr.
(Continued)

FOREIGN PATENT DOCUMENTS

EP 2913265 9/2015
EP 2947325 11/2015
(Continued)

*Primary Examiner* — Ian Jen
(74) *Attorney, Agent, or Firm* — Leason Ellis LLP

(57) ABSTRACT

A stability and command augmentation system for controlling an aircraft, comprising: a first member moveable by a pilot input device to a first position defining a first input; a second member moveable to a second position associated with a second input; and an adder device configured to add the first and second inputs and supply an output signal defining a command for an element to be controlled of the aircraft; the stability and command augmentation system comprises: a casing, a first and a second piston integrally movable with one another inside the casing and operatively connected to the second member; and control means configured to exert a first force on the first piston and a second force on the second piston; the second force is independent of the first force.

28 Claims, 3 Drawing Sheets

(51) Int. Cl.
*B64C 13/04* (2006.01)
*B64C 13/30* (2006.01)
*B64C 13/40* (2006.01)
*B64C 13/50* (2006.01)
*F15B 18/00* (2006.01)
*G05G 11/00* (2006.01)

(52) U.S. Cl.
CPC .............. *B64C 13/50* (2013.01); *F15B 18/00* (2013.01); *G05D 1/0808* (2013.01); *G05G 11/00* (2013.01)

(58) Field of Classification Search
CPC ....... B64C 11/305; B64C 27/32; B64C 27/54; B64C 39/04; B64C 39/10; B64C 39/12; B64C 13/00; B64C 13/505; B64C 2201/027; B64C 2201/108; B64C 27/10; B64C 27/57; B64C 39/024; B64C 13/0427; B64C 13/18; B64C 13/507; B64C 2027/004; B64C 2027/8236; B64C 2027/8281; B64C 2201/021; B64C 2201/042; B64C 2201/048; B64C 2201/104; B64C 2201/127; B64C 2201/162; B64C 2201/203; B64C 27/22; B64C 27/325; B64C 27/56; B64C 27/59; B64C 27/605; B64C 27/72; B64C 27/82; B64C 29/02; G05D 1/0077; G05D 1/0858; G05D 1/0816; G05D 1/0833; G05D 1/0623; G05D 1/0061; G05D 1/0607; G05D 1/0808; G05D 1/0661; G05D 1/102

See application file for complete search history.

(56) References Cited

U.S. PATENT DOCUMENTS 3,561,322 A  2/1971 Gerstine et al.
2014/0324254 A1* 10/2014 Lin .................. B64C 19/00
                                                701/4

FOREIGN PATENT DOCUMENTS

GB    1306908 A   2/1973
RU    2578706 C1  3/2016

* cited by examiner

STABILITY AND COMMAND AUGMENTATION SYSTEM FOR AN AIRCRAFT, AND STABILIZATION AND CONTROL METHOD OF AN AIRCRAFT

CROSS-REFERENCE TO RELATED PATENT APPLICATIONS

This application is a U.S. National Phase Application under 35 U.S.C. § 371 of International Patent Application No. PCT/IB2018/057759, filed October 5, 2018, which claims the priority of European Patent Application No. 17194901.9, filed Oct. 5, 2017, all of which are incorporated by reference, as if expressly set forth in their respective entireties herein.

TECHNICAL FIELD

The present invention relates to a stability and command augmentation system for controlling an aircraft, and to a stabilization and control method of an aircraft.

BACKGROUND ART

Aircraft comprise, in a known manner, a plurality of pilot-operable flight controls and a plurality of elements to be controlled operatively connected to the flight controls.

In particular, the aircraft is a helicopter or an aeroplane with direct flight controls, i.e. with flight controls mechanically or hydraulically connected directly to the elements to be controlled.

If the aircraft is an aeroplane, the elements to be controlled are the flight control surfaces.

Otherwise, known types of helicopters basically comprise a fuselage, a main rotor positioned on the top of the fuselage and rotating about its axis, and a tail rotor located at the end of the fuselage.

In greater detail, the rotor, in turn, basically comprises a hub rotatable about the aforementioned axis and equipped with a plurality of blades radially fastened in a cantilever manner to the aforementioned hub, and a mast connectable to a drive member and operatively connected to the hub to drive it in rotation.

The blades of the helicopter are hinged to the hub by respective physical or elastomeric hinges, so as to be free to rotate about one or more axes and so, implement different rotor configurations.

In particular, the blades are hinged to the hub so as to be able to rotate about respective longitudinal axes and so vary the respective pitch angles and the consequent lift generated.

In other words, the blades define the elements to be controlled by the flight controls.

In order to adjust the pitch angles of the blades, the helicopter comprises:
- a plurality of flight controls controllable by the pilot to perform the various maneuvers; and
- a plurality of mechanical connection chains interposed between the flight controls and a plurality of first actuators designed to control respective blades.

In greater detail, the helicopter comprises, with reference to the main rotor:
- a first flight control, known as the "collective pitch"; and
- a second flight control, known as the "cyclic pitch".

In particular, the first flight control, known as the collective pitch, enables collectively varying the pitch angle of the blades, thereby causing an increase or decrease in the lift generated by the rotor.

Instead, the second flight control, known as the cyclic pitch, enables cyclically varying the pitch angle of the blades. In consequence, the blades produce variable lift during their rotation about the axis, causing forward or backward inclination of the rotor disc.

The blades of the tail rotor are instead controllable by a third flight control so as to collectively vary the associated pitch angles and consequently the force they exert on the helicopter.

In other words, these collective variations in pitch angles enable controlling the helicopter's yaw angle.

Each first, second or third flight control generates a respective first input signal transmitted to the respective first actuator. In particular, this first input signal is substantially proportional to the position of the flight control.

Helicopters also comprise, in a known manner, for each element to be controlled:
- a Stability and Command Augmentation System, known as a SCAS, which generates a second input signal; and
- an adder device, which generates an output signal defining the command acting on the respective first actuator and equal to the sum of the first and second input signals.

In this way, for each flight control, the second input signal generated by the SCAS is superimposed on the first input signal, with the purpose of stabilizing the helicopter with respect to external disturbances.

According to a first known solution, the SCAS comprises a plurality of first actuators inserted in respective connection chains and controlled by the flight control system.

According to a further known solution, the SCAS comprises, for each first actuator:
- a second and a third actuator arranged parallel with and connected to a first lever;
- a second lever connected to the flight control so as to transfer the first input signal; and
- a third lever defining the adder device and operatively connected to the first and second levers, and to the first actuator so as to transfer the output signal.

In particular, the second input signal and the output signal are substantially proportional to the position of the first lever and of the third lever, respectively.

Furthermore, the second and the third actuator of each SCAS are controlled by the flight control system.

Even though effective, SCASes of a known type and described above are susceptible to improvement.

In particular, the second and third actuators arranged in parallel are controlled by a pair of mutually independent valves and are moveable to a first and a second position, respectively, in a mutually independent manner.

Due to this configuration, the second input signal is substantially determined by the sum of the first and the second position of the second and the third actuator.

The so-called full authority of control of the associated first actuator, i.e. the condition in which the relevant first actuator can be moved in the entire associated field of movement, is reached for certain excursion values of a first travel of the second actuator and a second travel of the third actuator.

In the event of a failure that causes malfunctioning, for example, of the second actuator and therefore a substantially null value for the first travel, the excursion of the second travel described by the third actuator must necessarily be double the nominal one, to ensure the full authority of control of the associated first actuator.

Furthermore, in the event of a hardover, i.e. a failure that causes locking in the end of travel position, for example, of the second actuator, the excursion of the second travel must be such as to compensate the fact that the second actuator cannot be moved in order to preserve the full authority of control of the associated first actuator.

With regard to this, the applicant has observed that in the event of a hardover, the risk of the first lever reaching the position of maximum extension for a few fractions of a second still occurs.

The described configuration of the SCAS also requires the presence of a considerable number of first, second and third levers, which must be housed in a limited space, thereby generating production and maintenance difficulties.

Furthermore, the flight control system is in a remote position with respect to the SCAS.

The flight control system is programmed to continually compare variable desired significant values, indicating the helicopter's position and attitude, with the effective values of the aforementioned significant variables, measured by opportune instruments, and is programmed to generate a consequent control signal for the second and third actuators. This control signal determines the second input.

This solution is suboptimal, as it requires the presence of numerous cables running between the flight control system and the second and third actuators. Moreover, the inevitable interference generated in the helicopter can alter the correct transmission of the control signal to the second and third actuators.

Lastly, the SCAS comprises, for each first actuator, a pair of travel stops arranged in fixed positions, which limit the maximum value of the second input signal to a certain fraction, typically 10% of the maximum value of the first input signal. In this way, the position of the first actuator is predominantly determined by the command given by the pilot on the operating lever, and consequently by the first input, and marginally by the command from the second input determined by the first and second actuators of the SCAS.

Within the industry, there is a need to adapt the range of maximum oscillation of the first signal to the effectively controlled flight control, so as to optimize operation of the helicopter.

EP-B-2947325 and EP-A-2913265 describe stability and command augmentation systems for an aircraft of a known type.

U.S. Pat. No. 3,561,322 discloses a stability and command augmentation system for controlling an aircraft and a stabilization and command method according to the preamble of claims 1, 21 and 24 respectively.

DISCLOSURE OF INVENTION

The object of the present invention is to provide a stability and command augmentation system for controlling an aircraft that allows overcoming at least one of the aforementioned drawbacks and/or satisfying at least one of the aforementioned needs associated with SCASes of a known type in a simple and inexpensive manner.

The aforementioned object is achieved by the present invention, in so far as it relates to a stability and command augmentation system for an aircraft according to claims 1 and 23.

Finally, the present invention relates to a stabilization and command method according to claim 24.

BRIEF DESCRIPTION OF THE DRAWINGS

For a better understanding of the present invention, a preferred embodiment is described hereinafter, purely by way of a non-limitative example and with reference to the accompanying drawings, in which.

BEST MODE FOR CARRYING OUT THE INVENTION

Figure 1:
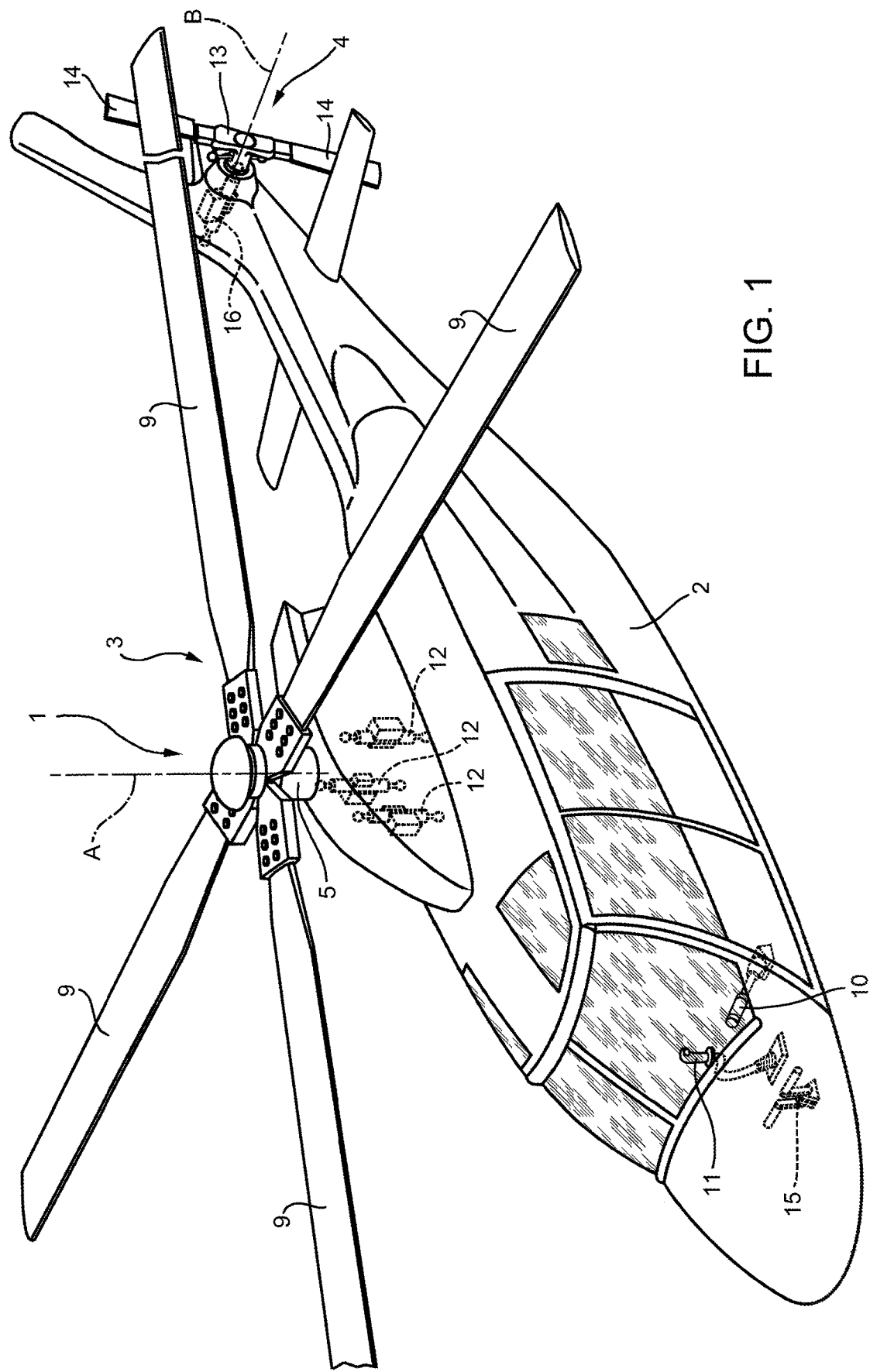
FIG. 1 is a perspective side view of a helicopter comprising a stability and command augmentation system for controlling an actuator for a flight control made according to the present invention, with parts removed for clarity.

Referring to FIG. 1, reference numeral 1 indicates a hover-capable aircraft, in particular a helicopter basically comprising a fuselage 2, a main rotor 3 located at the top of the fuselage 2 and rotating about an axis A, and a tail rotor 4 located at one end of the fuselage 2 and rotating about its own axis transversal to axis A.

In greater detail, the main rotor 3 comprises a hub 5 with axis A and on which a plurality of blades 9 are cantilever mounted and hinged, and which extend radially to axis A.

The blades 9 are hinged to the hub 5 such that their orientation can be changed with respect to their axes of extension, so as to adjust the respective pitch angles with respect to the airflow.

More specifically, the helicopter 1 comprises:
- a pilot-operable flight control 10 known as the "collective pitch" and operable to collectively vary the pitch angles of the blades 9, thereby causing an increase or decrease in the lift generated by the helicopter 1;
- a pilot-operable flight control 11 known as the "cyclic pitch" and operable to cyclically vary the pitch angle of the blades 9 according to the relative positions with respect to axis A; and
- a plurality of actuators 12, three in the case shown, controlled by the flight controls 11 and operatively connected to the blades 9 to adjust the respective pitch angles, on the basis of the flight controls 10, 11.

The rotor 4 comprises a hub 13 with axis B and on which a plurality of blades 14 are hinged in a cantilever manner, and which extend radially to axis A.

The blades 14 are hinged on the hub 5 such that their orientation with respect to the associated axes of extension can be varied collectively, so as to adjust the respective pitch angles with respect to the airflow.

The helicopter 1 also comprises:
- a pilot-operable flight control 15 for collectively varying the pitch angles of the blades 14, thereby controlling the yaw of the helicopter 1; and
- an actuator 16 controlled by the flight controls 15 and operatively connected to the blades 14 to adjust the respective pitch angles, on the basis of the flight control 15.

The helicopter 1 also comprises, for each actuator 12, 16 (FIG. 3):
- a respective lever 19 operatively connected to one or more respective flight controls 10, 11, 15;
- a respective stability and command augmentation system 20, referred to hereinafter as the SCAS 20; and
- a respective adder lever 21.

In the following description, reference will be made to a single actuator 12 and the associated SCAS 20, as all the actuators 12 and SCASes 20 are identical.

In greater detail, the lever 19 takes a position determined by the respective flight control 10, 11, 15 and so transmits an input signal xd determined by the action exerted by the pilot on the respective flight control 10, 11, 15.

The SCAS 20 comprises an output member 22, which transmits an input signal xd.

The adder lever 21 is connected to the output member 22 and to the lever 19, and provides an output signal xv equal to the sum of the input signals xi and xd.

In particular, the adder lever 21 comprises:
a segment 23 connected to the lever 19 at point G; and
a segment 24 connected to the output member 22 and to segment 23.

The adder lever 21 controls, as will become clear in the following description, the position of the actuator 12, and therefore of the associated flight control 11, 15.

Due to this configuration, the input signal xd generated by the SCAS 20 is added to the input signal xi generated by the pilot via the flight controls 11, 15, forming the output signal xv that enables stabilizing the helicopter 1 with respect to external disturbances.

In the case shown, the lever 19 is hinged about a moveable fulcrum C, the adder lever 21 is fixed to the lever 19 at shared point D, and the output member 22 is free to travel.

In particular, the SCAS 20 comprises:
an actuator 26 configured to control the position of the output member 22 and so determine input signal xd; and
a pair of control valves 27 controlled by the adder lever 21 and designed to control the position of the actuator 12, and, consequently, of the associated flight control 11, 15.

Advantageously, the actuator 26 comprises:
a casing 30;
a pair of pistons 31, 32 integrally movable with one another inside the casing 30 and operatively connected to the output member 22; and
control means 33 (only shown schematically in FIG. 3) configured to exert a first force on the piston 31 and a second force on the piston 32; the first and the second force being independent of each other.

Actuator 26 also comprises a rod 34 sliding inside the casing 30 and on which the pistons 31, 32 are fixed.

In other words, the pistons 31, 32 and the rod 34 form a pair of moveable elements arranged in series with respect to one another and respectively subjected to the first force and the second force.

The rod 34 is integrally moveable with the output member 22.

In the case shown, the rod 34 and the pistons 31, 32 are combined to create a single output member 22.

Figure 3:
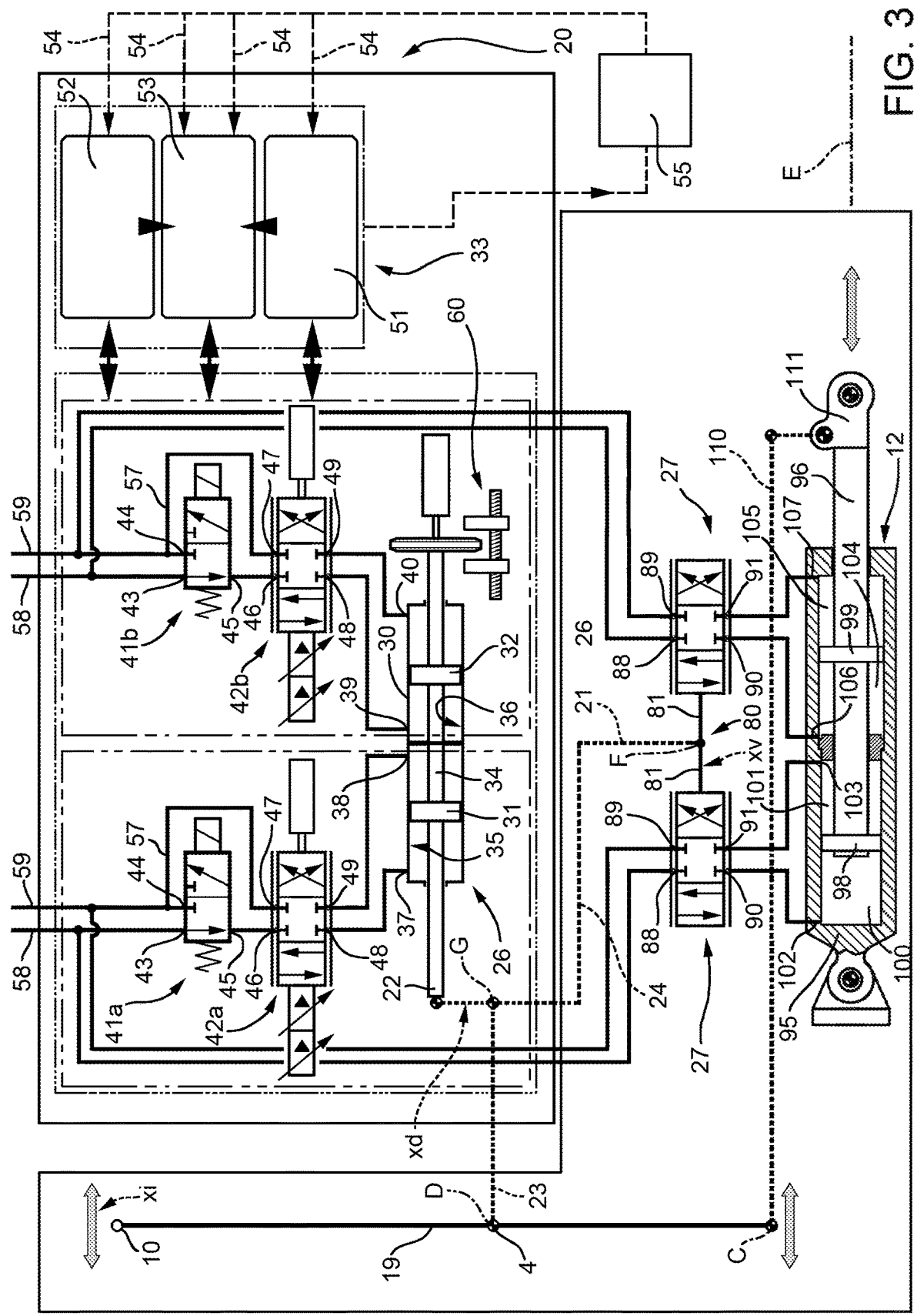
FIG. 3 is a functional diagram of the system in FIGS. 1 and 2.

Referring to FIG. 3, the casing 30 comprises a pair of chambers 35, 36 inside which the pistons 31, 32 respectively slide.

Each chamber 35, 36 comprises respective openings 37, 38; 39, 40 arranged on opposite sides of the respective piston 31, 32.

Actuator 26 also comprises a limit unit 60 to limit the travel of the rod 34 between two end positions. In consequence, this limit unit 60 limits the travel range of input xd generated by the SCAS 20.

In the case shown, the maximum travel range of input xd is a portion, for example 10%, of the maximum travel range of input xi.

Preferably, the limit unit 60 is configured so as to make the maximum travel range of input xd adjustable, according to the operating needs of the actuator 12, 16.

In greater detail, the limit unit 60 is carried by actuator 26.

In the case shown, the limit unit 60 comprises (FIG. 2):

an internally threaded cylinder 61 having an axis orthogonal to the axis of the rod 34, through which the rod 34 passes, and is arranged with play inside an unloaded portion 63 of the rod 34; and
a threaded head 62 screwed on the cylinder 61.

The cylinder 61 allows translation of the rod 34 for travel equal to the semidifference between the length of the unloaded portion 63 and the diameter of the cylinder 61 measured parallel to the sliding direction of the rod 34.

When it is necessary to adjust the maximum travel range of input xd, it is sufficient to vary the diameter of the cylinder 61 inserted in the unloaded portion 63, so as to enable adjustment of the maximum travel of the rod 34.

Actuator 26 also comprises a pair of springs 65, 66, coil springs in the case shown, coaxial with the rod 34 and designed to elastically preload the rod 34 in a desired centred position.

The control means 33 comprise, for each piston 31, 32 and the associated chamber 35, 36:
an associated valve 41a, 41b that comprises a pair of inlets 43, 44 and an outlet 45;
an associated valve 42a, 42b that comprises a pair of inlets 46, 47 and a pair of outlets 48, 49;
a line 58 fluidically connected to an environment containing oil under pressure and to the inlet 43 of the associated valve 41a, 41b; and
a line 59 fluidically connected to an environment at a discharge pressure and to the inlet 44 of the associated valve 41a, 41b and comprising a bypass 57 fluidically connected to the inlet 47 of the associated valve 42a, 42b.

Each valve 41a, 41b is selectively moveable:
to a respective first position (shown in FIG. 3), where it fluidically connects inlet 43 and outlet 45 and discharges inlet 44; and
to a respective second position, where it discharges inlet 43 and fluidically connects inlet 44 with outlet 45.

Each valve 42a, 42b is selectively moveable:
to a respective first position, where it fluidically connects inlets 46, 47 with outlets 48, 49, respectively, and therefore with openings 37, 38; or
to a respective second position, where it fluidically connects inlets 46, 47 with outlets 49, 48, respectively, and therefore with openings 37, 38; or
to a third respective position (shown in FIG. 3), where the inlets 46, 47 and outlets 49, 48 are fluidically connected to a discharge line.

The control means 33 also comprise:
a control unit 51 (shown schematically in FIG. 3) and programmed to control the valves 41a, 41b; 42a, 42b associated with piston 31; and
a control unit 52 (shown schematically in FIG. 3) and programmed to control the valves 41a, 41b; 42a, 42b associated with piston 32; and
a backup control unit 53 to use in the event of failure of one of the control units 51, 52.

The control units 51, 52, 53 are electrically connected via respective digital buses 54 to a flight control system 55 of the helicopter 1.

In greater detail, the flight control system 55 is programmed to determine a desired travel value for the rod 34 on the basis of measured values of certain significant characteristics of the position and attitude of the helicopter 1 and corresponding desired values for these characteristics, in order to stabilize the helicopter 1.

The flight control system 55 is also programmed to transmit this desired value to the control units 51, 52, 53 via the digital buses 54.

The control units 51, 52, 53 are programmed to:
calculate, on the basis of this desired value, opportune control rules for the valves 41a, 41b; 42a, 42b; and
transmit a feedback signal to the flight control system 55.

In this way, the control means 33 adjust the first and the second values of force acting on pistons 31 and 32, respectively, in a mutually independent manner.

The helicopter 1 also comprises a lever 80 (FIGS. 2 and 3) operatively connected to the adder lever 21 at its section F, sliding parallel to a direction E, and designed to command the control valves 27.

More specifically, the lever 80 comprises a pair of arms 81 arranged on respective opposite sides of section F.

Referring to FIG. 3, each control valve 27 comprises:
a pair of inlets 88, 89 fluidically connected to the outlets 47, 48 of a respective valve 42a, 42b; and
a pair of outlets 90, 91.

Each control valve 27 is movable by the respective arm of the lever 80 between:
a first neutral position (shown in FIG. 3), where the inlets 88, 89 are discharged;
a second position, where inlets 88, 89 are fluidically connected to outlets 90, 91, respectively; and
a third position, wherein inlets 88, 89 are fluidically connected to outlets 91, 90, respectively.

More specifically, the control valves 27 are normally arranged in the respective first neutral positions, are moved by the associated arms 81 of the lever 80 to the respective second positions or third positions following operation of the control lever 19 and return to the respective first positions once the actuator 12 has reached the desired position.

Figure 2:
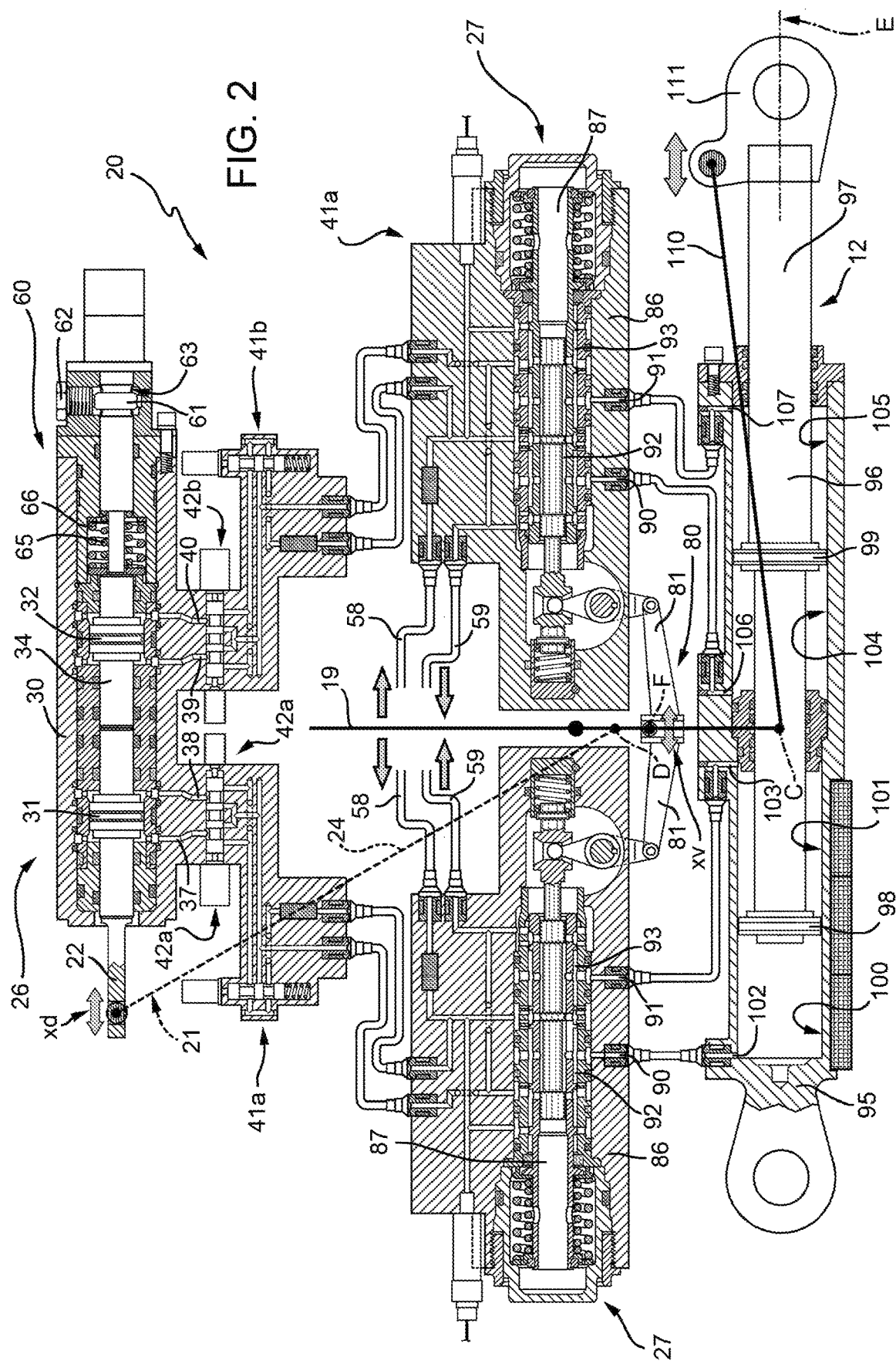
FIG. 2 is a sectional view of some components of the system in FIG. 1.

Referring to FIG. 2, each control valve 27 comprises:
a casing 86 defining the inlets 88, 89 and outlets 90, 91; and
a piston 87 sealingly sliding inside the casing 86 and connected to a respective arm 81 of the lever 80.

The casing 86 and the piston 87 of each control valve 27 in turn define:
a chamber 92, into which the associated inlet 88 and outlet 90 face; and
a chamber 93, into which the associated inlet 89 and outlet 91 face.

The actuator 12 comprises:
a casing 95; and
a piston 96, in turn comprising a rod 97 and a pair of ridges 98, 99 protruding from the rod 97 and sealingly sliding inside the casing 95.

The casing 95 and the ridge 98 define a pair of chambers 100, 101 arranged at respective opposite ends of the ridge 98 and provided with respective inlets 102, 103 fluidically connected to respective outlets 90, 91 of one of the control valves 27. The casing 95 and the ridge 99 define a pair of chambers 104, 105 arranged at respective opposite ends of the ridge 99 and provided with respective inlets 106, 107 fluidically connected to respective outlets 90, 91 of the other control valve 27.

In this way, the control valves 27 control the position of the rod 97 of the actuator 12 on the basis of the position of lever 80 and, in consequence, of the adder lever 21.

Finally, the rod 97 comprises a feedback lever 110 connected to the respective lever 19.

In greater detail, the feedback lever 110 is connected to an axial end 111 of the rod 97 positioned externally to the casing 95.

The feedback lever 110 is also connected to lever 19 at fulcrum C, so as to cause, following translation of the rod 97, the translation of the adder lever 21 and of point D so that lever 80 is returned to the respective neutral position.

Operation of the helicopter 1 is described with reference to just actuator 12, just the corresponding lever 19, adder lever 21 and output member 22, and just the corresponding SCAS 20.

Furthermore, operation of the helicopter 1 is described starting from the configuration shown in FIG. 2, where lever 80 keeps the control valves 27 in the respective first neutral positions. In this configuration, piston 96 and therefore the blades 9, 14 are arranged in a first operating position.

In greater detail, the pilot acts on the flight control 10, 11, 15, causing a rotation of lever 19 about fulcrum C by an angle associated with the command given by the pilot and generating input signal xi.

The flight control system 55 generates a desired translation value for the output member 22 and the rod 34 (for example towards the right, referring to FIGS. 2 and 3), and the corresponding second input signal xd. These desired translation values and input signals are determined based on a comparison between measured values of certain significant characteristics of the position and attitude of the helicopter 1 and corresponding desired values for these characteristics.

These desired translation values are transmitted by the flight control system 55 to the control units 51, 52 of the SCAS 20 by respective digital buses 54.

The control units 51, 52 of the SCAS 20 control the valves 41a 41b; 42a, 42b respectively associated with the pistons 31, 32 of the actuator 26, thereby causing the movement of the rod 34 and the output member 22.

More specifically, the oil under pressure circulating in line 58 determines the first and the second force on the respective pistons 31, 32, placing the rod 34 in the position associated with the second input signal xd.

It is important to stress that the pistons 31, 32 mechanically arranged in series are identical, as are the translations of the pistons 31, 32 and the rod 34.

The limit unit 60 limits the travel of the rod 34 between two end positions, limiting the travel range of input signal xd to an opportune fraction of input signal xi.

It is important to stress that the travel range of input signal xd, and consequently the distance between the aforementioned two end positions, is adjustable according to the operating needs of the actuator 12.

The adder lever 21 is translated by a distance equal to the sum of lever 19 and the output member 22, resulting in an output signal xv equal to the sum of the input signals xi and xd.

In this way, the command given by the pilot via the flight controls 10, 11, 15 is added to the input signal xd generated by the SCAS 20, so as to stabilize the behaviour of the helicopter 1 with respect to external disturbances.

The output signal xv is transmitted by the adder lever 21 to the actuator 12 via lever 80 and the control valves 27.

More specifically, the translation of the adder levers 21 causes translation of the arms 81 of lever 80 parallel to direction E, for example towards the right, referring to FIGS. 2 and 3.

This translation causes each control valve 27 to move from the corresponding first neutral position to the respective second position or third position.

More specifically, the translation of the arms 81 causes translation of the pistons 87 of the control valves 27, thereby varying the pressure inside the chambers 101 of the actuator 12 and, consequently, moving the piston 96 connected to the blades 9, 14 from the first operating position to the second operating position.

The feedback lever 110 translates together with the rod 97 of piston 96 and causes translation of fulcrum C and consequently of point D and section F, the adder levers 21 and the arms 81, so as to return the control valves 27 to the respective first neutral positions again and keep the actuator 12 in the second operating position.

From examination of the SCAS 20 and the method according to the present invention, the advantages that can be obtained therewith are evident.

In particular, the SCAS 20 comprises a pair of pistons 31, 32 integrally movable with one another inside the casing 30 and operatively connected to the movable member 22, and control means 33 configured to exert the first and the second mutually different forces on the pistons 31, 32.

In other words, the pistons 31, 32 are mechanically arranged in series and describe the same translation travel.

Due to this, it is possible to maintain full authority of the actuator 12, 16 even by acting just on the pistons 31, 32.

In greater detail, in the event of failure of one of the valves 42a, 42b—and therefore the substantial impossibility of moving the associated piston 31, 32—it is sufficient that the control means 33 intervene by isolating the failed valve by operating the respective valve 41a, 41b, and then controlling the still-active valve 42a, 42b to move the rod 34—and therefore the actuator 12, 16—to any position.

In other words, in the event of failure of one of the valves 42a, 42b, it is not necessary to increase the travel of the piston 31, 32 controlled by the other one of the valves 42a, 42b in order to maintain complete authority over the actuator 12.

In this way, with particular reference to the hardover condition of one of the pistons 31, 32, the risk that complete authority over the actuators 12 cannot be achieved, even if only for a few fractions of a second, is mitigated.

Due to the fact that the pistons 31, 32 are mechanically arranged in series instead of in parallel, it is possible to reduce the number of levers required by the SCAS 20, simplifying the manufacture and maintenance of the latter. This is particularly advantageous when considering the fact that the space available for these levers is very limited.

In addition, the control units 51, 52 are carried on the SCAS 20 and are programmed to:
determine opportune control rules for the valves 41a, 41b; 42a, 42b; and
transmit the feedback signal to the flight control system 55.

In this way, it is possible to reduce the cabling between the flight control system 55 and the SCASes 20, and reduce the risk that the inevitable interference generated in the helicopter 1 can alter the correct transmission of the signals with respect to solutions of a known type and described in the introductory part of this description.

The helicopter 1 also comprises a plurality of limit devices 60, which enable adjusting the maximum travel range of the second input xd according to the operating characteristics of the respective actuators 12, so as to optimize operation of the helicopter 1.

Finally, it is clear that modifications and variants can be made regarding the SCAS 20 without departing from the protective scope defined in the claims.

Likewise, the helicopter 1 could be an aeroplane with direct flight controls 10, 11, 15, i.e. that are connected directly to the flight surfaces, in a mechanical or hydraulic manner.

The invention claimed is:

1. A stability and command augmentation system for an aircraft, comprising:
a first member moveable by a pilot input device to a first position defining a first input;
a second member moveable to a second position associated with a second input; and
an adder device configured to add said first and second inputs, and supply an output signal defining a command for an element to be controlled of said aircraft;
a casing;
a first and a second piston integrally movable with one another inside said casing and operatively connected to said second member; and
control means configured to exert a first force on said first piston and a second force on said second piston;
said second force being, in use, independent of said first force;
said control means further comprising:
a first valve configured to exert said first force on said first piston; and
at least a second valve configured to exert said second force on said second piston;
said casing defining a first chamber and a second chamber; said first piston sealingly sliding within said first chamber and said second piston sealingly sliding within said second chamber;
said first valve being selectively controllable to create a first differential pressure value in first portions of said first chamber arranged at respective opposite ends of said first piston;
said second valve being selectively controllable to create a second differential pressure value in second portions of said second chamber arranged at respective opposite ends of said second piston;
said system further comprising a rod sliding inside said casing, on which said first and second pistons are fixed and integrally movable with said second member; said system further comprising an adjustable limit device for the travel of said second member between a first and a second stop position;
at least one of said first and second stop positions being selectively adjustable;
said adjustable limit device comprising:
an internally threaded cylinder having an axis orthogonal to the axis of said rod, said rod passing through said internally threaded cylinder, said internally threaded cylinder being arranged with play inside an unloaded portion of said rod; and
a threaded head screwed on said cylinder.

2. The system according to claim 1, wherein said control means is electronically connectable to a flight control system to receive a command associated with said second input signal and is programmed to move said second member on the basis of said command.

3. The system according to claim 2, further comprising a digital bus designed to transmit said command to said control means.

4. The system according to claim 2, wherein said control means comprises a first control unit programmed to control said first valve and a second control unit programmed to control said second valve.

5. The system according to claim 4, wherein said control means comprises a third backup control unit.

6. The system according to claim 5, wherein said limit device is carried on said casing.

7. The system of claim 1, further comprising an actuator configured to control the position of said second member and to determine said second input;
said actuator comprising said casing, said first and second pistons and said control means.

8. The system of claim 7, wherein said control means comprises:
said first valve and said second valve;
said first control unit being programmed to control said first valve associated with said first piston;
said second control unit being programmed to control said second valve associated with said second piston; and
said backup control unit to be used in the event of failure of one of said first control unit and second control unit.

9. The system of claim 8, further comprising:
a third and a fourth valve comprising, each, a pair of respective first and second inlets and a respective outlet;
a first line fluidly connected to an environment containing an operative fluid under pressure and to said respective first and second inlets;
a second line fluidly connected to a second environment at a discharge pressure and to said first and second inlets of said respective third valve and said fourth valve, and comprising a bypass fluidly connected to a further inlet of respective first and second valves.

10. The system of claim 9, wherein each third and fourth valve is selectively moveable:
to a respective first position, where each of said third valve and said fourth valve fluidly connects respective said first inlet and said respective outlet, and discharges said second inlet; and
to a respective second position, where each of said third valve and said fourth valve discharges respective said first inlet, and fluidly connects connected said respective outlet and said second inlet.

11. The system of claim 10, wherein said first control unit is programmed to control said third valve associated with said first piston, and in that said second control unit is programmed to control said fourth valve associated with said second piston.

12. An aircraft comprising:
at least one pilot-operable flight control;
at least one element to be controlled;
at least one actuator operatively connected to said element to be controlled and said at least one flight control;
a flight control system; and
at least one stability and command augmentation system comprising:
a first member moveable by a pilot input device to a first position defining a first input;
a second member moveable to a second position associated with a second input;
an adder device configured to add said first and second inputs, and supply an output signal defining a command for an element to be controlled of said aircraft;
a casing;
a first and a second piston integrally movable with one another inside said casing and operatively connected to said second member; and
control means configured to exert a first force on said first piston and a second force on said second piston;
said second force being, in use, independent of said first force;
said control means further comprising:
a first valve configured to exert said first force on said first piston; and
at least a second valve configured to exert said second force on said second piston;
said casing defining a first chamber and a second chamber; said first piston sealingly sliding within said first chamber and said second piston sealingly sliding within said second chamber;
said first valve being selectively controllable to create a first differential pressure value in first portions of said first chamber arranged at respective opposite ends of said first piston;
said second valve being selectively controllable to create a second differential pressure value in second portions of said second chamber arranged at respective opposite ends of said second piston;
said system further comprising a rod sliding inside said casing, on which said first and second pistons are fixed and integrally movable with said second member; said system further comprising an adjustable limit device for the travel of said second member between a first and a second stop position;
at least one of said first and second stop positions being selectively adjustable;
said adjustable limit device comprising:
an internally threaded cylinder having an axis orthogonal to the axis of said rod, said rod passing through said internally threaded cylinder, said internally threaded cylinder being arranged with play inside an unloaded portion of said rod; and
a threaded head screwed on said cylinder.

13. The aircraft of claim 12, wherein said control means is electronically connectable to said flight control system to receive a command associated with said second input signal and is programmed to move said second member on the basis of said command.

14. The aircraft of claim 13, wherein said first, second and back up control units are electrically connected by respective digital buses.

15. The aircraft of claim 14, wherein said flight control system is configured to determine a desired travel value for said rod, on the basis of measured values of certain significant characteristics of the position and attitude of said aircraft and corresponding desired values for said characteristics, in order to stabilize said aircraft.

16. The aircraft of claim 13, wherein said first and second control units are programmed to:
determine opportune control rules for said first and second valves and for said third and fourth valves; and
transmit a feedback signal to said flight control system.

17. A stabilization and command method of an aircraft, comprising the steps of:
i) operating a flight control to move a first member to a first position defining a first input;
ii) moving a second member to a second position associated with a second input; and
iii) adding said first and second inputs to generate an output defining a command for an element to be controlled of said aircraft;
iv) moving, by control means, a first and a second piston operatively connected to said second member inside a casing
v) exerting a first force on said first piston and a second force on said second piston; said second force being independent of said first force;
vi) exerting said first force on said first piston by means of a first valve; and
vii) exerting said second force on said second piston by means of a second valve;

said casing defining a first chamber and a second chamber; said first piston sealingly sliding within said first chamber and said second piston sealingly sliding within said second chamber;

said method further comprising the steps of:

viii) selectively controlling said first valve to create a first differential pressure value in first portions of said first chamber arranged at respective opposite ends of said first piston;

ix) selectively controlling said second valve to create a second differential pressure value in second portions of said second chamber arranged at respective opposite ends of said second piston;

said system further comprising a rod sliding inside said casing, on which said first and second pistons are fixed and integrally movable with said second member;

said method further comprising the steps of:

x) limiting the travel of said second member between a first stop position and a second stop position; and xi) selectively adjusting at least one of said first and second stop positions;

said adjustable limit device comprising:

an internally threaded cylinder having an axis orthogonal to the axis of said rod, said rod passing through said internally threaded cylinder, and said internally threaded cylinder being arranged with play inside an unloaded portion of said rod; and a threaded head screwed on said cylinder.

18. The method according to claim 17, further comprising the steps of:

xii) electronically connecting said control means to a flight control system to receive a command associated with said second input signal; and xiii) moving said second member on the basis of command.

19. A stability and command augmentation system for an aircraft, comprising:

a first member moveable by a pilot input device to a first position defining a first input;

a second member moveable to a second position associated with a second input; and an adder device configured to add said first and second inputs, and supply an output signal defining a command for an element to be controlled of said aircraft;

an actuator configured to control the position postion of said second member and to determine said second input;

a casing;

a first and a second piston integrally movable with one another inside said casing and operatively connected to said second member;

control means configured to exert a first force on said first piston and a second force on said second piston;

a first valve configured to exert said first force on said first piston; and at least a second valve configured to exert said second force on said second piston;

characterized in that said control means comprise a first control unit programmed to control said first valve and a second control unit programmed to control said second valve;

said actuator comprising said casing, said first and second pistons and said control means;

said control means comprising:

said first valve and said second valve;

said first control unit being, which is programmed to control said first valve associated with said first piston;

said second control unit being, which is programmed to control said second valve associated with said second piston; and a backup control unit to be used in the event of failure of one of said first control unit and second control unit;

said control means being electronically connectable to a flight control system to receive a command associated with said second input signal and being programmed to move said second member on the basis of said command.

20. The system according to claim 19, further comprising a digital bus designed to transmit said command to said control means.

21. The system of claim 20, further comprising:

a third and a fourth valve comprising, each, a pair of respective first and second inlets and a respective outlet;

a first line fluidly connected to an environment containing an operative fluid under pressure and to said respective first and second inlets;

a second line fluidly connected to a second environment at a discharge pressure and to said first and second inlets of said respective third and fourth valve, and comprising a bypass fluidly connected to a further inlet of respective first and second valves.

22. The system of claim 21, wherein each third and fourth valve is selectively moveable:

to a respective first position, where each of said third valve and said fourth valve fluidly connects respective said first inlet and said respective outlet, and discharges said second inlet; and to a respective second position, where each of said third valve and said fourth valve discharges respective said first inlet, and fluidly connect said respective outlet and said second inlet.

23. The system of claim 22, wherein said first control unit is programmed to control said third valve associated with said first piston, and in that said second control unit is programmed to control said fourth valve associated with said second piston.

24. An aircraft comprising:

at least one pilot-operable flight control;

at least one element to be controlled;

at least one actuator operatively connected to said element to be controlled and said at least one flight control;

a flight control system; and at least one stability and command augmentation system comprising: according to claim a first member moveable by a pilot input device to a first position defining a first input;

a second member moveable to a second position associated with a second input;

an adder device configured to add said first and second inputs, and supply an output signal defining a command for an element to be controlled of said aircraft;

a casing;

a first and a second piston integrally movable with one another inside said casing and operatively connected to said second member; and control means configured to exert a first force on said first piston and a second force on said second piston;

said second force being, in use, independent of said first force;

said control means further comprising:

a first valve configured to exert said first force on said first piston; and at least a second valve configured to exert said second force on said second piston;

said casing defining a first chamber and a second chamber; said first piston sealingly sliding within said first chamber and said second piston sealingly sliding within said second chamber;

said first valve being selectively controllable to create a first differential pressure value in first portions of said first chamber arranged at respective opposite ends of said first piston;

said second valve being selectively controllable to create a second differential pressure value in second portions of said second chamber arranged at respective opposite ends of said second piston;

said system further comprising a rod sliding inside said casing, on which said first and second pistons are fixed and integrally movable with said second member; said system further comprising an adjustable limit device for the travel of said second member between a first and a second stop position;

at least one of said first and second stop positions being selectively adjustable;

said adjustable limit device comprising:
an internally threaded cylinder having an axis orthogonal to the axis of said rod, said rod passing through said internally threaded cylinder, and said internally threaded cylinder being arranged with play inside an unloaded portion of said rod; and
a threaded head screwed on said cylinder.

25. The aircraft of claim 24, wherein said control means is electronically connectable to said flight control system to receive a command associated with said second input signal and are programmed to move said second member on the basis of said command.

26. The aircraft of claim 25, wherein said first, second and back up control units are electrically connected by respective digital buses to said flight control system.

27. The aircraft of claim 26, wherein said casing defines a first chamber and a second chamber; said first piston sealingly sliding within said first chamber and said second piston sealingly sliding within said second chamber;
said first valve being selectively controllable to create a first differential pressure value in first portions of said first chamber arranged at respective opposite ends of said first piston;
said second valve being selectively controllable to create a second differential pressure value in second portions of said second chamber arranged at respective opposite ends of said second piston;
said system comprising a rod sliding inside said casing, on which said first and second pistons are fixed and integrally movable with said second member;
said flight control system being configured to determine a desired travel value for said rod, on the basis of measured values of certain significant characteristics of the position and attitude of said aircraft and corresponding desired values for said characteristics, in order to stabilize said aircraft.

28. The aircraft of claim 21, wherein said first and second control units are programmed to:
determine opportune control rules for said first and second valves and for said third and fourth valves; and
transmit a feedback signal to said flight control system.

* * * * *